United States Patent Office 2,759,967
Patented Aug. 21, 1956

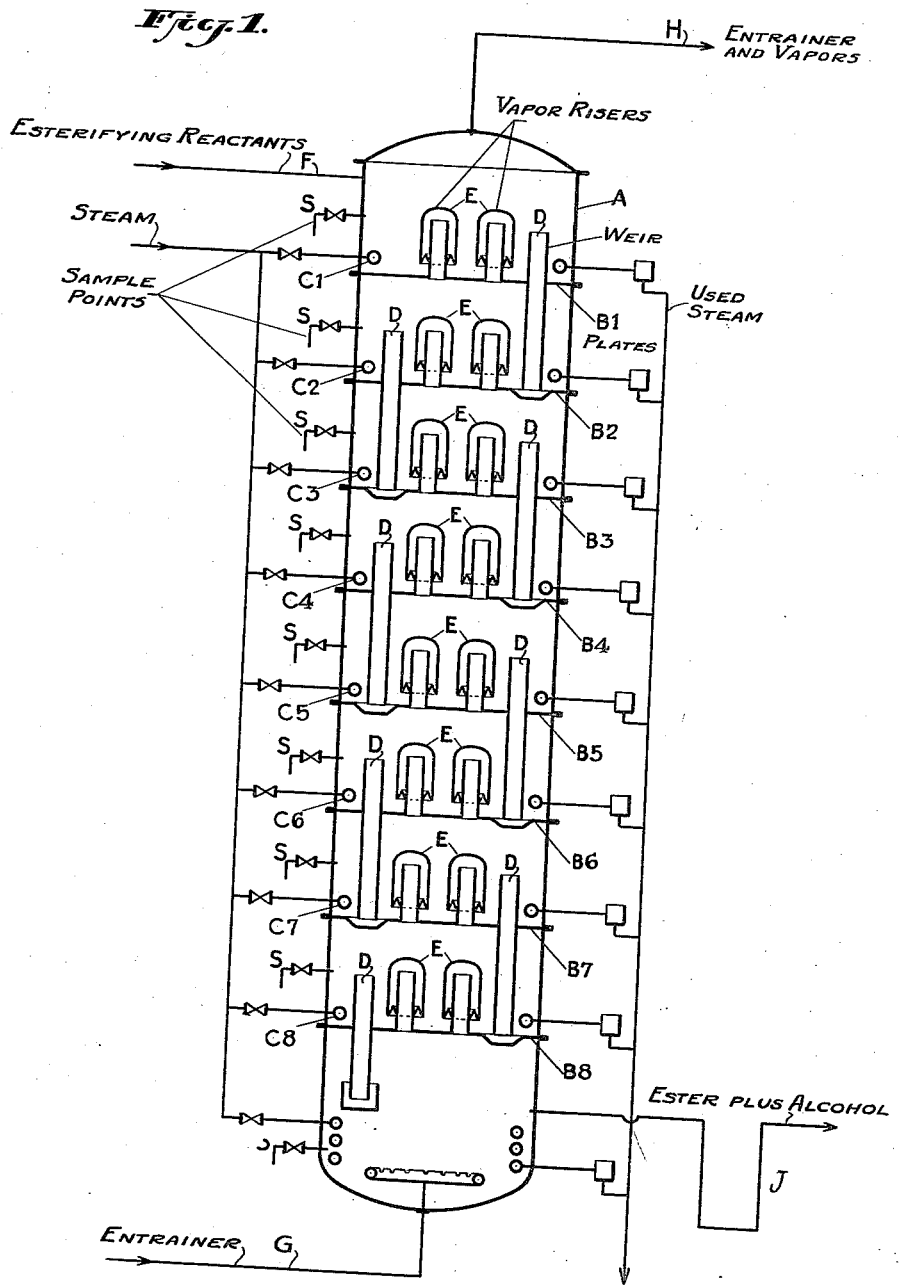

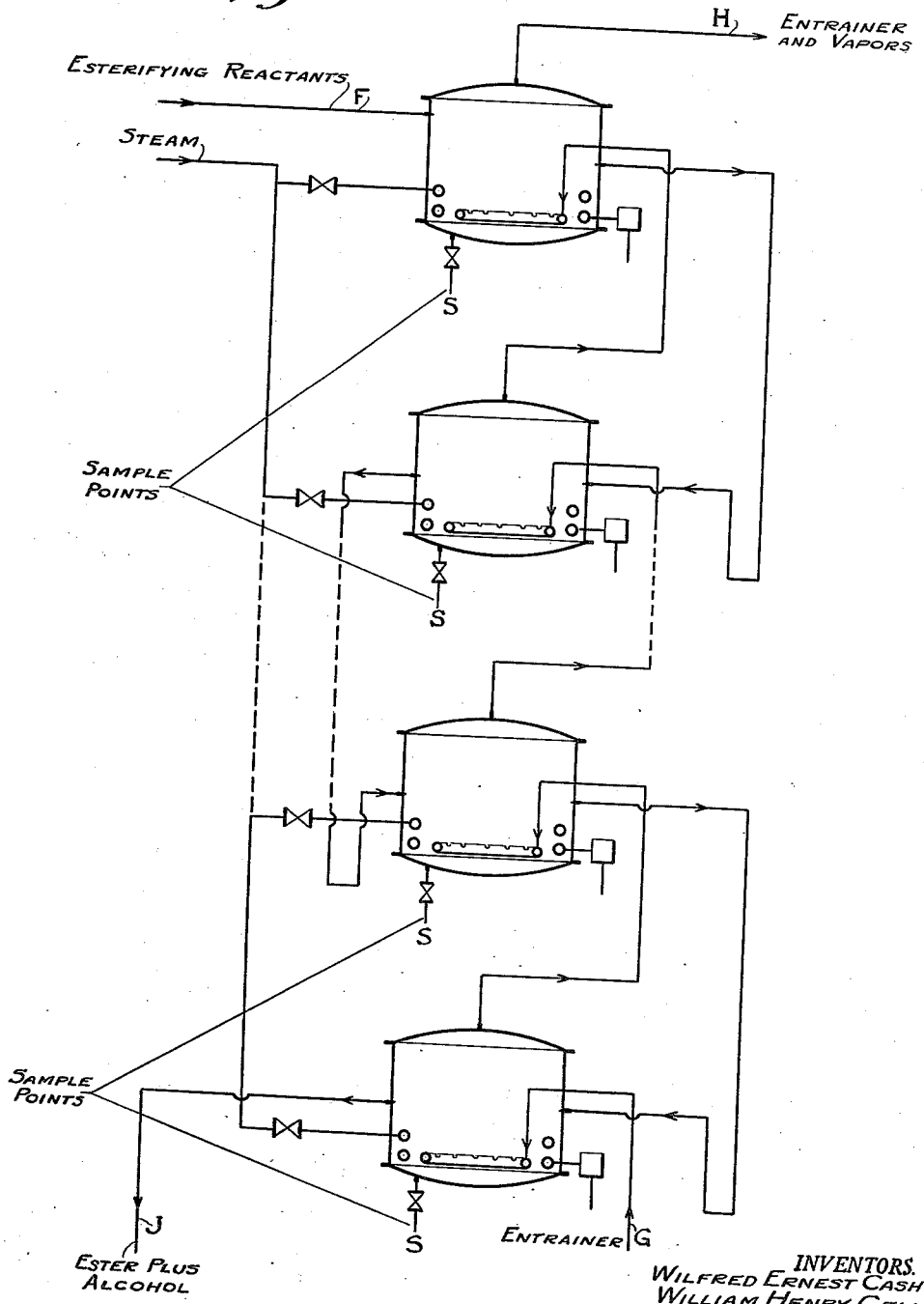

2,759,967
CONTINUOUS ESTERIFICATION PROCESS

Wilfrid Ernest Cash, Cheam, and William Henry Gell, Hull, England, assignors to The Distillers Company Limited, Edinburgh, Scotland, a British company Application February 19, 1953, Serial No. 337,838

Claims priority, application Great Britain February 23, 1952

4 Claims. (Cl. 260—475)

The present invention relates to the esterification of monohydric alcohols with relatively non-volatile organic acids and has as one object the provision of a process whereby such esterification may be conducted continuously to give an ester of very low organic acid content.

The invention, accordingly, comprises the novel processes and steps of processes, specific embodiments of which are described hereinafter by way of example and in accordance with which we now prefer to practise the invention.

According to the present invention the process for the production of a non-volatile ester, as hereinafter defined, comprises passing a mixture comprising an alcohol, an organic carboxylic acid, carboxylic acid anhydride, carboxylic acid ester, or neutral carboxylic acid ester of a relatively volatile alcohol as hereinafter defined, together with an esterification catalyst, concurrently through a series of at least three consecutive zones, said zones each being provided with independent heating means, and being maintained at such temperatures that fractionation of the reactants is substantially avoided, passing an entrainer countercurrently to the mixture, withdrawing entrainer and entrained vapours from one or more of the zones in the region where the mixture is introduced, and withdrawing the esterified product from one or more of the zones in the region where the entrainer is introduced.

By "non-volatile" as applied to the ester is meant having a lower volatility than any of the other components of the reaction mixture, excluding the esterification catalyst.

By "relatively volatile" as applied to the "relatively volatile alcohol" is meant more volatile than the first mentioned monohydric alcohol.

Among the carboxylic acids and anhydrides which can be esterified by the process of this invention may be mentioned phthalic acid, phthalic anhydride, sebacic acid, lactic acid, isovaleric acid, butyric acid, acetic acid, acetic anhydride, salicylic acid, benzoyl-benzoic acid, maleic acid, maleic anhydride and stearic, citric, glutaric, malonic, adipic, and fumaric acids, while among the alcohols which can be esterified may be mentioned methyl, ethyl, propyl, butyl, amyl, hexyl, heptyl, octyl, nonyl and decyl alcohols, cyclohexanol, phenylethanol, methoxy-ethanol, ethylene glycol, diethylene glycol and glycerol. Acid esters, such as the mono-esters of any of the above-mentioned dicarboxylic acids may be esterified in the same way, and it is frequently convenient, when dealing with dicarboxylic acids or their anhydrides, to form the monoester first in a mixing zone in the presence of excess alcohol, and then lead the solution of monoester in alcohol to the succession of reaction zones. In the production of mixed esters, an acid ester of a different alcohol may be esterified in this way.

The esterification catalyst employed may be of the conventional type, and sulphuric acid is preferred, suitable concentrations being in the range 0.05–2% by weight and particularly 0.1–0.5% by weight.

The entrainer employed to remove the water or alcohol from the esterification or alcoholysis mixture respectively, will depend in the usual way on the nature of the alcohol undergoing reaction. Thus, in the production by esterification of lower alkyl esters including butyl esters, it is most convenient to use the same alcohol as the entrainer, while with the higher boiling alcohols, such as monohydric alcohols of at least 5 carbon atoms and polyhydric alcohols, it is generally more convenient to use a separate entrainer such as an aromatic hydrocarbon of 6–8 carbon atoms, for example benzene. The spent entrainer vapour may be treated separately so that the entrainer can be recycled.

In the case of alcoholysis, where a low boiling alcohol is replaced by a higher boiling one, an inert gas may be blown through the reaction mixture or an azeotrope former may be added, the use of an inert gas being also suitable for esterifications. In some cases the higher boiling alcohol is a suitable entrainer. However, the particular entraining agent employed does not form a critical part of this invention, and any of those used for the same reaction when conducted batchwise will generally be suitable.

Owing to the provision of separate heating means for each esterification zone, the temperature in each zone can be controlled at the optimum for the particular reaction. By this means fractionation of the volatile reactants, with consequently the necessity for reflux leading to an undesired temperature gradient, is avoided. In general, the liquid in each zone is maintained at the same temperature, but in certain circumstances some variation in temperature may be required. For instance when reaction at the optimum temperature tends to result in a coloured ester, the later reaction zones may be operated at a slightly reduced temperature. The means for heating the zones may consist of steam coils, electrical heating or the like, and may be situated in the liquid in each zone or in the vapour or liquid lines connecting one zone with the next, or a combination of these methods may be used.

The process of the invention may conveniently be effected in an apparatus similar in general construction to a bubble cap fractionating column, with the following difference. Each section is provided with a steam heating coil or other suitable heating means located in the liquid so that the temperature in each zone can be controlled independently. Alternatively, the heating means may be located in the vapour above the liquid level. Preferably, also, the liquid seal in each section is deeper than on the normal fractionating column plate to give an increased residence time to the liquid. This enables a much smaller number of sections to be used; for instance any number above three, such as five or eight, may give satisfactory results.

An apparatus of the former type is shown in Figure 1 of the accompanying drawings.

Figure 2 shows an alternative form of apparatus employing exactly the same principle, the main difference being that the sections are constructed as separate vessels.

In Figure 1, the column A has eight plates $B_1$, $B_2$, $B_3$ . . . etc. Steam heating coils $C_1$, $C_2$, $C_3$ . . . etc. are supplied from a manifold and independently controlled by means of valves, the condensate from the coils being bled off through steam traps into another manifold. The column is provided with downpipe weirs D, and vapour risers E, with their associated bubble caps. The mixture to be esterified is fed in through the pipe F and liquid or gaseous entrainer through the pipe G, while the entrainer and entrained vapours are led off via the pipe H and the ester product plus any excess alcohol via the pipe J. Sample points S are provided for each section so that the course of the esterification throughout the apparatus may be checked. Thermometers (not shown) are also provided in each section.

Where the mixture to be esterified comprises a high boiling acid or anhydride, for example phthalic anhydride, the entrainer will merely collect the water liberated in the reaction. Entrainer and water vapour are then led to a separate decanter or fractionating column, depending on whether the entrainer is immiscible with water or not, and dry entrainer is returned to the base of the esterification apparatus. Where the mixture to be esterified, on the other hand, comprises a more volatile acid such as acetic acid, the entrainer will remove this component together with the water. In such a case, the entrainer and entrained vapours are led to a fractionating column where water is taken off overhead while the entrainer and acid are returned to the base of the apparatus.

The upper limit to the number of sections or vessels is not critical and is principally a matter of convenience, there being no particular advantage in employing, say, 50 such sections instead of 5 if the contact time is maintained the same. Also, it is obviously not always essential to have all the sections heated. Moreover, the process may be operated with only partial counter-current flow of entrainer, the bottom two or three sections, say, being supplied independently with fresh dry entrainer, and the combined vapours from these sections led to the third or fourth section respectively for subsequent countercurrent flow to the head of the apparatus.

One of the advantages of the process of the present invention is the economy of entrainer secured by using it in countercurrent flow to the reactants, while the yield and quantity of ester produced remain at the same high level. If required, the advantages of countercurrent flow of the alcoholic component to the other reactant may be secured by adding more of the former to the later zones, thereby ensuring a minimum of organic acid in the product. Thus the reaction may be commenced with an excess of the organic acid, and the alcohol added during the progress of the reaction mixture through the successive zones until a slight or considerable excess is present in the effluent, though an excess of the alcohol throughout the system may be maintained if desired. A further advantage in the process of the invention arises from the independent temperature control of each esterification zone. Only in this way is it possible to maintain the temperature in each zone at or near the optimum, a factor which is extremely important when it is borne in mind that in many of these esterifications a fall of only 10° C. will result in the reaction velocity being halved.

The following examples illustrate the production of esters according to this invention, employing the apparatus of the type shown in Figure 1.

*Example 1.—Di(2-ethylhexyl) phthalate*

The esterification unit consisted of eight sections above a base section, i. e., eight bubble cap plates. The liquid volume in each section was 3.75 gallons.

A feed mixture was prepared from phthalic anhydride and ethyl hexanol in a molar ratio of 1:2.75 and sulphuric acid was added to give 0.15% on the feed mixture. This mixture was fed into the top of the column, while benzene as entrainer, at the rate of 9 gallons per hour, was introduced at the bottom. The organic acidity of the liquid on the section immediately above the base section was determined, when conditions were stable, as 0.2% as phthalic acid. The water-benzene vapour was removed from the head of the column, condensed and passed to a separator, whence the benzene was returned to the bottom of the column.

Further details of the run are given in the following table and show the advantages in throughput per unit reaction volume and in benzene circulation per unit of the product.

| | |
|---|---|
| Reaction volume, gallons | 30 |
| Monoester/alcohol feed, G. P. H. | 17 |
| Per cent w./w. monoester in feed (app.) | 40 |
| Residence time, hours | 1.7 |
| Average reaction temperature, °C. | 150 |
| Lbs. di-(2-ethyl-hexyl) phthalate produced/gallon reaction volume/hr | 3.7 |
| Lbs. of benzene circulated per lb. of di-(2-ethyl-hexyl) phthalate produced | 0.7 |
| Organic acidity of product as per cent w./w. of phthalic acid on di-(2-ethyl-hexyl) phthalate | 0.3 |
| Per cent of phthalic anhydride esterified to diester | 98.7 |
| Lbs. of ethyl hexanol per lb. of di-(2-ethyl-hexyl) phthalate in product | 0.25 |

In the above procedure the average reaction temperature in the reaction mixture was maintained at approximately 150° C. throughout the esterification apparatus by adjusting the amount of heat supplied to each section. By way of contrast the procedure was repeated in the same apparatus but heat was only supplied to the base and top sections of the esterification unit. In this way the incoming feed at the top of the unit was at 150° C. in the top section of the column and similarly the contents of the base section of the unit were also maintained at 150° C. In spite of the fact that the whole unit was well lagged against heat losses, the temperature of the reaction mixture in the intervening sections of the esterification unit dropped due to the heat absorbed in the vaporisation of the water formed in the esterification reaction. When the reaction is carried out in this way the total conversion to ester falls when the throughput in the unit is maintained at the same level as in the example proper.

*Example 2.—Di-(2-ethyl-hexyl) phthalate*

A feed mixture was prepared from phthalic anhydride and 2-ethyl hexanol in the molar ratio of approximately 1:3, and sulphuric acid was added to give 0.10 to 0.15% by weight on the feed mixture. This mixture was fed continuously into the top plate of the reaction column, which had eight plates and a base section into which latter benzene vapour was introduced continuously as entrainer. The temperature of the liquid in the plates and base section was maintained at 150° C.

The water-benzene vapour was removed from the head of the reaction column, condensed and passed to a separator from which the benzene was returned to the base of the reaction column after passing down a conventional fractionating column which served to remove final traces of water from the benzene.

The liquid volume in each plate section was 3.75 gallons and in the base section 12.3 gallons.

The organic acidity of the liquid in the base section was determined, when conditions were stable, as 0.13% as phthalic acid.

Details of the run are as follows:

| | |
|---|---|
| Reaction volume, gallons | 42.3 |
| Monoester/alcohol feed, G. P. H. | 18.6 |
| Per cent w./w. monoester in feed | 43.5 |
| Residence time, hours | 2.27 |
| Average reaction temperature, °C. | 150 |
| Lbs. di-(2-ethyl-hexyl) phthalate produced/gal. reaction volume/hr | 2.65 |
| Lbs. of benzene circulated/lb. of di-(2-ethyl-hexyl) phthalate produced | 1.0 |
| Organic acidity of product as per cent w./w. of phthalic acid on di-(2-ethyl-hexyl) phthalate | 0.17 |
| Per cent of phthalic anhydride esterified to diester | 99.2 |
| Lbs. of 2-ethyl hexanol per lb. of di-(2-ethyl-hexyl) phthalate in product | 0.33 |

Example 3.—Di-butyl phthalate

Feed: Anhydride plus alcohol in molar ratio of 1:3, plus catalyst (up to 0.15% by weight on reactants).

Reaction column as in Example 2.

Entrainer: Butyl alcohol. Vapours from the head of the reaction column were led directly to an intermediate plate of a conventional fractionating column having its own reboiler, and operated separately from the reaction column. From the head of the fractionating column, the butyl alcohol-water azeotrope was obtained. This was condensed and decanted, the upper layer formed on decantation being returned to the fractionating column as reflux and the lower aqueous layer removed for stripping of butanol in a second fractionating column. Dry butanol from the base of the first fractionating column was returned to the base of the reaction column.

The organic acidity of the product was determined on the liquid in the base section.

| Run No. | 1 | 2 |
|---|---|---|
| Reaction volume, gallons | 42.3 | 42.3 |
| Monoester/alcohol feed, G. P. H | 15 | 16.5 |
| Percent w./w. monoester in feed | 51.5 | 51.5 |
| Residence time, hours | 2.82 | 2.56 |
| Average reaction temperature, °C | 150 | 150 |
| Lbs. di-butyl phthalate produced/gal. reaction volume/hr | 2.33 | 2.58 |
| Lbs. of butanol circulated/lb. of dibutyl phthalate produced | 0.65 | 0.51 |
| Organic acidity of product as percent w./w. of phthalic acid on dibutyl phthalate | 0.24 | 0.27 |
| Percent of phthalic anhydride esterified to diester | 99.2 | 99.1 |
| Lbs. of butanol/lb. of dibutyl phthalate in product | 0.16 | 0.16 |

Example 4.—Dimethyl phthalate

Feed: Anhydride plus methanol in molar ratio of 1:3, plus catalyst (up to 0.15% by weight on reactants).

Reaction column similar to above.

Entrainer: Methanol. Vapours from the head of the reaction column were led directly to an intermediate plate of a conventional fractionating column, having its own reboiler and operated separately from the reaction column. Dry methanol obtained at the head of the fractionating column was returned to the base of the reaction column. Water from the base of the fractionating column was rejected.

The organic acidity was determined on the liquid in the lowest plate in the reaction column (i. e. the plate immediately above the base section).

| | |
|---|---|
| Reaction volume, gallons | 30 |
| Monoester/alcohol feed, G. P. H | 13 |
| Per cent w./w. monoester in feed | 60 |
| Residence time, hours | 2.3 |
| Average reaction temperature, ° C | 150 |
| Lbs. dimethyl phthalate produced/gal. reaction volume/hour | 3.43 |
| Lbs. of methanol circulated/lb. of dimethyl phthalate produced | 0.75 |
| Organic acidity of product as per cent w./w. of phthalic acid on dimethyl phthalate | 0.52 |
| Per cent of phthalic anhydride esterified to diester | 98.8 |
| Lbs. of methanol/lb. of dimethyl phthalate in product | 0.02 |

We claim:

1. A process for the production of a non-volatile ester which comprises passing a liquid reaction mixture of an alcohol and an organic reagent selected from the group consisting of carboxylic acids, carboxylic acid anhydrides, carboxylic acid esters and neutral carboxylic acid esters of relatively volatile alcohols, together with an esterification catalyst concurrently through a series of at least three consecutive zones, said zones each being provided with independent heating means and being maintained at such temperatures that fractionation of the reactants is substantially avoided, passing a vaporized entrainer countercurrently to the mixture through the liquid reaction mixture in the entrainer entrance zone and into successive zones containing said mixture to an exit near the entrance zone for said alcohol and reagent and withdrawing the esterified product from one or more zones in the region where the entrainer is introduced.

2. A process for the production of dimethyl phthalate which comprises forming a mixture of phthalic anhydride and a stoichiometrical excess of methanol together with sulphuric acid as esterification catalyst in a first mixing zone, and passing the solution so produced comprising methyl hydrogen phthalate and methanol, concurrently through a series of at least three consecutive zones, said zones each being provided with separate heating means and being maintained at about 150° C., passing vaporized methanol as entrainer countercurrently through the mixture in the entrainer entrance zone and into successive zones containing said mixture, and withdrawing the esterified product comprising dimethyl phthalate from one or more zones in the region where the methanol entrainer is introduced.

3. A process for the production of dibutyl phthalate which comprises forming a mixture of phthalic anhydride and a stoichiometrical excess of butanol together with sulphuric acid as esterification catalyst in a first mixing zone, and passing the solution so produced comprising butyl hydrogen phthalate and butanol, concurrently through a series of at least three consecutive zones, said zones each being provided with separate heating means and being maintained at about 150° C., passing vaporized butanol as entrainer countercurrently through the mixture in the entrainer entrance zone and into successive zones containing said mixture and withdrawing the esterified product comprising dibutyl phthalate from one or more zones in the region where the butanol entrainer is introduced.

4. A process for the production of di-(2-ethyl-hexyl) phthalate which comprises forming a mixture of phthalic anhydride and a stoichiometrical excess of 2-ethylhexanol together with sulphuric acid as esterification catalyst in a first mixing zone, and passing the solution so produced comprising 2-ethyl-hexyl hydrogen phthalate and 2-ethylhexanol, concurrently through a series of at least three consecutive zones, said zones each being provided with separate heating means and being maintained at about 150° C., passing vaporized benzene as entrainer countercurrently through the mixture in the entrainer entrance zone and into successive zones containing said mixture and withdrawing the esterified product comprising di-(2-ethyl-hexyl) phthalate from one or more zones in the region where the benzene entrainer is introduced.

References Cited in the file of this patent

UNITED STATES PATENTS 2,644,009    Cash et al. _____ June 30, 1953